United States Patent [19]
Yutaka et al.

[11] Patent Number: 5,760,782
[45] Date of Patent: Jun. 2, 1998

[54] METHOD AND APPARATUS FOR GENERATING IMAGES

[75] Inventors: Teiji Yutaka, Kanagawa; Masakazu Suzuoki, Tokyo; Makoto Furuhashi; Masayoshi Tanaka, both of Kanagawa, all of Japan

[73] Assignee: Sony Corporation, Tokyo, Japan

[21] Appl. No.: 835,157

[22] Filed: Apr. 4, 1997

Related U.S. Application Data

[63] Continuation of Ser. No. 417,123, Apr. 5, 1995, Pat. No. 5,659,672.

[30] Foreign Application Priority Data

Apr. 7, 1994 [JP] Japan .................. 6-093740

[51] Int. Cl.[6] ........................................ G06F 15/00
[52] U.S. Cl. ........................................ 345/429
[58] Field of Search .................. 345/429, 430, 345/431, 428, 432, 147, 148, 149

[56] References Cited

U.S. PATENT DOCUMENTS

| | | | |
|---|---|---|---|
| 4,297,691 | 10/1981 | Kodama et al. | 395/128 |
| 5,276,798 | 1/1994 | Peasler et al. | 395/162 |
| 5,303,334 | 4/1994 | Snyder et al. | 395/109 |
| 5,459,823 | 10/1995 | Silverbrook et al. | 395/131 |
| 5,659,672 | 8/1997 | Yutaka et al. | 395/130 |

*Primary Examiner*—Phu K. Nguyen
*Attorney, Agent, or Firm*—Frommer Lawrence & Haug LLP; William S. Frommer

[57] ABSTRACT

There is provided a method and apparatus for generating an image which make it possible to prepare texture images of normal brightness and to generate a texture-mapped image as an image brighter than the original texture images.

In a system for mapping texture images prepared in advance onto polygonal areas obtained by a drawing process with brightness calculated for each of the polygonal areas, a brightness level lower than the maximum brightness level that can be rendered by the system is used as the maximum brightness level of the texture image prepared in advance, and the rendering of brightness during the mapping of the texture images onto the polygonal areas can be performed with brightness higher than the original brightness of the texture images.

1 Claim, 7 Drawing Sheets

METHOD AND APPARATUS FOR GENERATING IMAGES

This application is a continuation of application Ser. No. 08/417,123, filed Apr. 5, 1995, now U.S. Pat. No. 05,259,672.

BACKGROUND OF THE INVENTION

1. Field of the Invention

The present invention relates to an image generation apparatus which generates an image, for example, in an three-dimensional graphic system, by mapping images which have been prepared in advance (texture images) onto polygons generated by a drawing operation with a brightness calculated for each polygon.

2. Description of the Related Art

In a three-dimensional graphic system, for example, an object is displayed as an aggregate of a multiplicity of polygons, and each of the polygons can be modified by a texture image prepared in advance. Such modification of polygons is achieved by performing a process called texture mapping in which texture images are applied to polygons. During such texture mapping, in order to give the displayed object a three-dimensional appearance, a so-called shading process is carried out in which the position of a virtual light source is set and each polygon is shaded in relation to the light source. Such shading is carried out by assigning a shading constant K=1 (i.e., the brightness of the original texture image) to the brightness of the polygon in the position where the highest brightness is obtained from the virtual light source and by setting the shading factors K for polygons darker than that to values which are smalller than 1 and which depend on how dark they are.

Conventionally, texture images prepared for texture mapping have been rendered using the entire dynamic range for representing the brightness of the image display device. As a result, the brightness of polygons can be set only in the direction in which it is reduced during texture mapping. Accordingly, it has not been possible to perform texture mapping so that texture images are mapped with a brightness higher than that of the original color thereof.

Therefore, considering the necessity to render an image with a brightness higher than the original normal brightness as encountered in rendering the scene of an explosion, it has been necessary to prepare texture images with a higher brightness than the normal brightness. An image having a normal appearance (image having a normal brightness) has been generated by mapping texture images of a higher brightness as described above so that the brightness is reduced.

The applicant has made the following Japanese patent applications which are related to the drawing device according to this application.

05-190763 (filed on Jun. 30, 1993)
05-190764 (filed on Jul. 2, 1993)
05-258625 (filed on Oct. 15, 1993)
06-027405 (filed on Jan. 31, 1994)

Each of the above applications is owned by the assignee of the present invention and is hereby incorporated by reference. (Applications for U.S. patent corresponding to these four Japanese patent applications are pending.)

As described above, for conventional texture mapping, texture images having a brightness higher than a normal brightness are created in advance in order to render an image with an increased brightness. Therefore, it is not possible to create texture images having a normal appearance. This has resulted in a difficulty in creating texture images. There is another problem in that the creation of texture images takes a long time.

For example, an image having a normal brightness created using texture mapping is generated by reducing the brightness of the texture images of a higher brightness prepared in advance. This makes it difficult to render an image with a natural normal brightness because such a process renders even an image having a normal brightness with a darker appearance.

The present invention confronts the above-described problem, and it is an object of the present invention to provide a method and apparatus for generating an image which make it possible to prepare texture images of a normal brightness and to generate a texture-mapped image as an image brighter than the original texture images.

SUMMARY OF THE INVENTION

In order to solve the above-described problem, according to the present invention, there is provided a method of generating an image in a system for mapping texture images prepared in advance onto polygonal areas obtained by a drawing process with a brightness calculated for each of the polygonal areas, wherein a brightness level lower than the maximum brightness level that can be rendered by the system is used as the maximum brightness level of the texture image prepared in advance and wherein brightness rendering during the mapping of the texture images onto the polygonal areas can be performed with a brightness higher than the original brightness of the texture images.

Further, according to the present invention, there is provided an image generation apparatus for mapping texture images prepared in advance onto polygonal areas obtained by a drawing process with a brightness calculated for each of the polygonal areas, including a first mapping means for performing the mapping so that a brightness level M lower than the maximum brightness level that can be rendered is used as the maximum brightness level that can be rendered using the texture images and a second mapping means for mapping the texture images so that they can be rendered at a brightness level higher than the brightness level M.

According to the present invention having the above-described configuration, the maximum brightness level of the texture images prepared for texture mapping is set to a brightness level lower than the maximum brightness level that can be rendered by the system for performing the texture mapping. As a result, it is possible to render images having a brightness equal to or lower than the brightness of the original color of the prepared texture images using the dynamic range of a brightness equal to or lower than the above-described low brightness level.

Images brighter than the prepared texture images can be rendered with a brightness that lies between the maximum brightness level that can be rendered by the system and the above-described lower brightness level.

Since images brighter than the prepared texture images can be thus rendered, the texture images may be prepared with a normal brightness that gives a natural appearance. Further, since images brighter than the prepared texture images can be easily obtained, patterns of explosions and so-called whitened images appearing on game machines and the like can be easily generated from prepared texture images having a normal appearance.

As described above, according to the present invention, images formed using texture mapping can be rendered with a brightness higher than that of the original color of texture images prepared in advance. This makes it possible to cause images formed using texture mapping to flash and to obtain the so-called whitening effect.

Further, since it is not necessary to create the texture images prepared in advance with the highest possible brightness unlike the prior art, the texture images can be created to have a normal appearance. As a result, the burden of the creation of application programs can be reduced, and texture-mapped images can be rendered with natural appearance without unnaturalness such as a too dark tone.

BRIEF DESCRIPTION OF THE DRAWINGS

FIGS. 3A–3C illustrates an operation of the embodiment shown in FIG. 1.

DETAILED DESCRIPTION OF PREFERRED EMBODIMENTS

Figure 4:
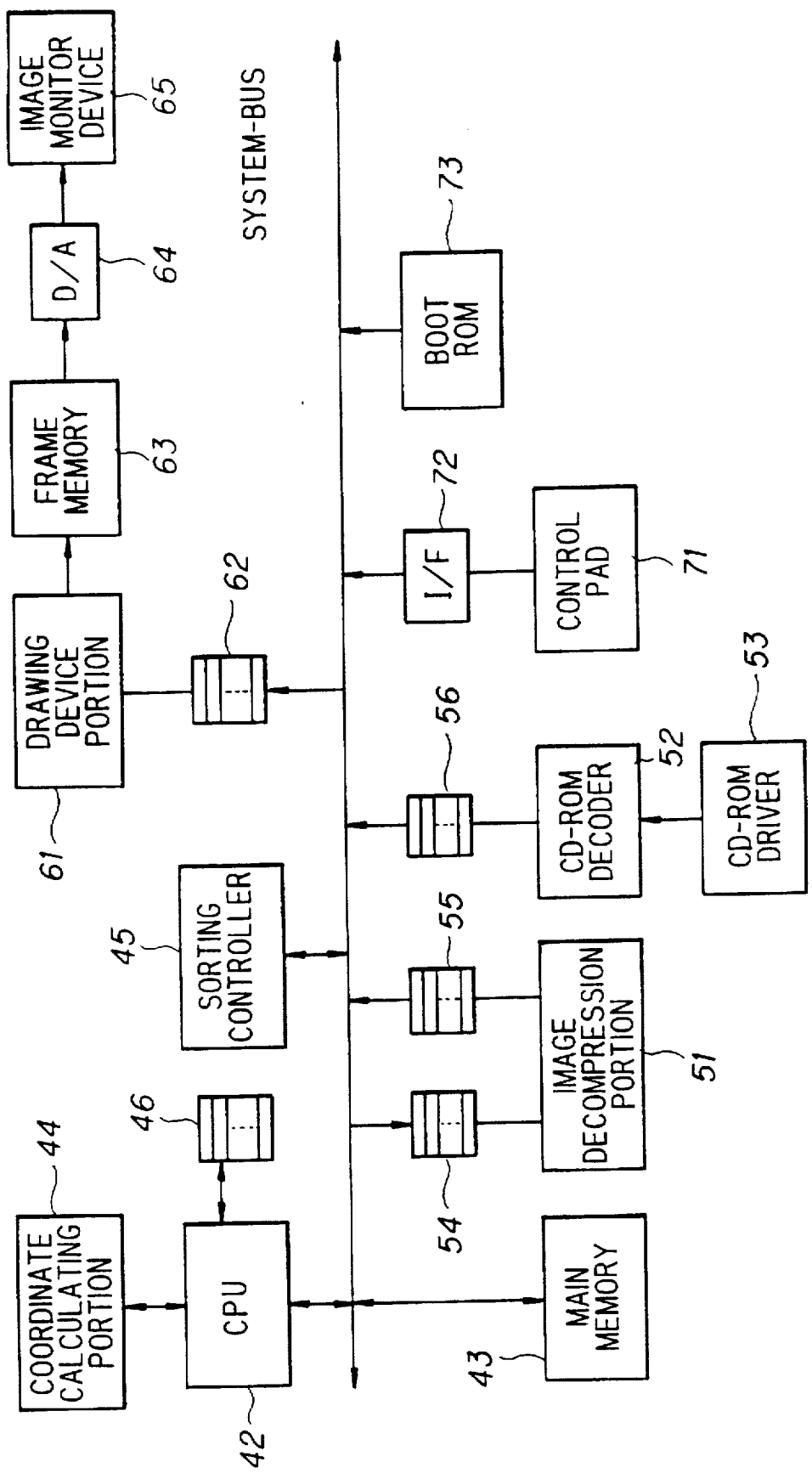
FIG. 4 is a block diagram illustrating an image generation apparatus according to the present invention as a whole.

An embodiment of the present invention will now be described with reference to the accompanying drawings. FIG. 4 shows an example of a configuration of an image generation apparatus according to an embodiment of the present invention. This is an example the implementation of the invention in a game machine having a 3D graphic function and a dynamic image reproducing function.

In FIG. 4, 41 designates a system bus (main bus). A CPU 42, a main memory 43, and a sorting controller 45 are connected to the system bus 41.

An image decompression device portion 51 is also connected to the system bus 41 through an FIFO buffer memory 54 for input (hereinafter the FIFO buffer memory is simply referred to as an FIFO buffer) and an FIFO buffer 55 for output. Further, a CD-ROM decoder 52 and a drawing device portion 61 are also connected to the system bus 41 through an FIFO buffer 56 and an FIFO buffer 62, respectively.

71 designates a control pad 71 as a control input means which is also connected to the system bus 41 through an interface 72. In addition, a boot ROM 73 is connected to the system bus 41 in which a program for starting up the game machine is stored.

The CO-ROM decoder 52 is connected to a CD-ROM driver 53 and decodes an application program (e.g., the program of a game) and data recorded on a CD-ROM disc loaded in the CD-ROM driver 53. For example, a CD-ROM disc stores image data for dynamic images and still images which have been subjected to image compression using discrete cosine transformation (DCT) and image data for texture images for modifying polygons. The application program in the CD-ROM disc includes polygon draw commands. The FIFO buffer 56 has a capacity to store one sector of the data recorded on the CD-ROM disc.

The CPU 42 manages the system as a whole. The CPU 42 also performs a part of a process of drawing an object as an aggregate of a multiplicity of polygons. Specifically, the CPU 42 generates a string of draw commands for generating images which constitute one screen on the main memory 43, as described later.

The CPU 42 includes a cache memory 46 which allows some of CPU instructions to be executed without fetching them over the system bus 41. Further, the CPU 42 is equipped with a coordinate calculating portion 44, as an internal coprocessor of the CPU, which performs calculations for converting the coordinates of polygons when draw commands are created. The coordinate calculating portion 44 performs calculations for three-dimensional coordinate conversion and conversion of three dimensions into two dimensions on a display screen.

Since the CPU 42 incorporates the command cache 46 and the coordinate calculating portion 44 as described above, the processes in the CPU 42 can be performed without using the system bus 41 to some extent, and this increases opportunities to leave the system bus 41 unoccupied.

The image decompression device portion 51 decompresses compressed image data reproduced from a CD-ROM disc and includes hardware for a decoder for decoding Huffman codes, an inverse quantization circuit, and an inverse discrete cosine transformation circuit. The process at the part of the Huffman code decoder may be performed by the CPU 42 on a software basis.

In this embodiment, the image decompression device portion 51 divides one (one frame of) image into small areas each consisting of, for example, 16×16 pixels (hereinafter such an area is referred to as a macro-block) and performs image-decompression-decoding on each macro-block. Data is transferred between this portion and the main memory 43 on a macro-block basis. Therefore, the FIFO buffers 54 and 55 have a capacity to store one macro-block.

A frame memory 63 is connected to the drawing device portion 61 through a local bus 11. The drawing device portion 61 executes draw commands transferred thereto from the main memory 43 through the FIFO buffer 62 and writes the result in the frame memory 63. The FIFO buffer 62 has a memory capacity to store one draw command.

The frame memory 63 includes an image memory area for storing drawn images, a texture area for storing texture images, and a table memory area for storing a color look-up table (or color conversion table) CLUT.

Figure 5:
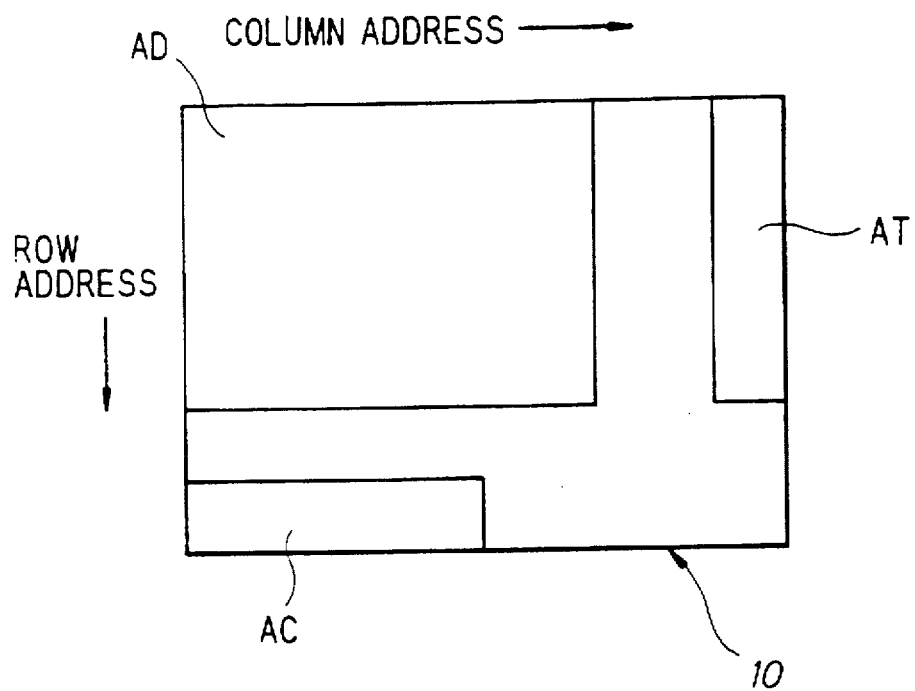
FIG. 5 illustrates a memory area of a frame memory in an embodiment of an image generation apparatus according to the present invention.

FIG. 5 shows the memory space of the frame memory 63. The frame memory is addressed using two-dimensional addresses, i.e., column and row addresses. In this two-dimensional address space, an area AT is used as the texture area. Plural kinds of texture patterns can be provided in this texture area AT. AC represents the table memory area for the color conversion table CLUT.

As described later in detail, the data in the color conversion table CLUT is transferred by the sorting controller 45 from the CD-ROM disc to the frame memory 63 through the CD-ROM decoder 52. The data of the texture images in the CD-ROM disc is subjected to data-decompression at the image decompression device portion 51 and is transferred to the frame memory 63 through the main memory 43.

In FIG. 5, AD represents an image memory area which includes two frame buffer areas, i.e., an area for drawing and an area for display. In this embodiment, the frame buffer area which is currently used for display is referred to as a display buffer and the area in which drawing is being performed is referred to as a drawing buffer. In this case, while drawing is performed using one of the areas as a drawing buffer, the other is used as a display buffer. When the drawing is completed, the functions of those buffers are switched. The switching of the drawing and display buffers is carried out simultaneously with vertical synchronization when the drawing is completed.

The image data read from the display buffer of the frame memory 63 is output through a D-A converter 64 to an image monitor device 65 to be displayed on the screen thereof.

The sorting controller 45 has functions similar to those of the so-called DMS controller and constitutes a transfer means for transferring image data between the main memory 43 and the image decompression device portion 51 and for transferring a string of draw commands from the main memory 43 to the drawing device portion 61. The sorting controller 45 performs the above-described transfer processes taking advantage of the time intervals when the system bus 41 is not occupied by other devices such as the CPU 42 and the control pad 71 without intervention of the CPU 42. In this case, an arrangement may be made such that the CPU 42 notifies a the sorting controller 45 of the unoccupied state of the system bus 41 or such that the sorting controller 45 forcibly requests the CPU 42 to free the bus.

In order to store the image data of dynamic images and still images, the main memory 43 includes a memory area for compressed image data and a memory area for decompressed image data which has been subjected to decompression-decoding. The main memory 43 also includes a memory area for graphics data such as a string of draw commands (such an area is hereinafter referred to as a packet buffer).

The packet buffer is used for the setting of a draw command string performed by the CPU 42 and the transfer of the draw command string to the drawing device portion and is shared by the CPU 42 and the drawing device portion 61. In order to allow parallel processing between the CPU 42 and the drawing device portion 61, in this embodiment, two packet buffers, i.e., a packet buffer for setting the draw command string and (hereinafter referred to as a setting packet buffer) and a packet buffer for transfer (hereinafter referred to as an execution packet buffer), are provided. When one of the buffers is used as the setting packet buffer, the other is used as the execution packet buffer and, when the execution using the execution packet buffer is finished, the functions of the two packet buffers are switched. The process in this device will be described below.

[Data Fetching from CD-ROM Disc]

When the device (game machine) in the embodiment in FIG. 4 is powered up and a CD-ROM disc is loaded, the CPU 42 executes a program for a so-called initialization process in preparation for the execution of the game in the boot ROM 73. The data recorded on the CD-ROM disc is then fetched. At this time, decoding of user data is performed based on identification information ID included in user data in each sector of the CD-ROM disc to check the data. Based on the result of this check, the CPU 42 executes processing according to the reproduction data of the contents indicated by each ID.

Specifically, compressed image data, draw commands, and programs to be executed by the CPU 42 are read from the CD-ROM disc through the CD-ROM driver 53 and the CD-ROM decoder 52 and are loaded in the main memory 43 by the sorting controller 45. Among the loaded data, the information of the color conversion table is transferred to the area CLUT of the frame memory 63.

[Decompression and Transfer of Compressed Image Data]

Among the data input to the main memory 43, compressed image data is subjected to Huffman-code-decoding performed by the CPU 42 and, thereafter, is rewritten in the main memory 43 by the CPU 42. The sorting controller 45 transfers the image data which has been subjected to the Huffman-code-decoding from the main memory 43 to the image decompression device portion 51 through the FIFO buffer 54. The image decompression device portion 51 performs a decompress-decoding process on the image data through an inverse quantization process and an inverse DCT process.

The decompressed image data is transferred by the sorting controller 45 to the main memory 43 through the FIFO buffer 55. The image decompression device portion 51 decompresses the image data on a macro-block basis as described above. As a result, the compressed data on a macro-block basis is transferred by the sorting controller 45 from the main memory 43 to the input FIFO buffer 54. Upon completion of decompress-decoding of one macro-block, the image decompression device portion 51 inputs the resultant decompressed image data in the FIFO buffer 55 for output and fetches the compressed data of the next macro-block from the input FIFO buffer 54 to perform decompress-decoding on it.

If the system bus 41 is unoccupied and the output FIFO buffer 55 of the image decompression device portion 51 is not empty, the sorting controller 45 transfers the decompressed image data for one macro-block to the main memory 43 and transfers the compressed image data for the next macro-block from the main memory 43 to the input FIFO buffer 54 of the image decompression device 51.

When a predetermined number of macro-blocks of decompressed image data have been accumulated in the main memory 43, The CPU 42 transfers the decompressed data to the frame memory 63 through the drawing device portion 61. If the decompressed data is transferred to the image memory area AD of the frame memory 63, it will be displayed as it is on the image monitor device 65 as a background dynamic image. Alternatively, the data may be transferred to the texture area AT of the frame memory 63. The image data in the texture area AT is used as a texture image for modifying a polygon.

[Processing and Transfer of Draw Command String]

Polygons which constitute faces of an object may be drawn in the order of decreasing depths in accordance with Z data which is information on three-dimensional depths to display an image having three-dimensional appearance on a two-dimensional image display surface. The CPU 42 creates a string of draw commands on the main memory 43, which causes the drawing device portion 61 to draw polygons in the order of decreasing depths as described above.

In computer graphics the so-called Z buffer method is employed wherein the priorities for the display of polygons are decided based on Z data stored for each pixel. According to the Z buffer method, however, a memory having a large capacity is required to store the Z data. In order to solve this, according to this embodiment, the CPU 42 performs the process of deciding the priorities for the display of polygons as follows.

For this purpose, a polygon draw command IP in this embodiment has a structure as shown at A in FIG. 4. Specifically, the polygon draw command IP has a header which precedes a polygon drawing data PD. The header portion includes a tag TG and a command identification code CODE.

The address on the main memory 43 where the next draw command is stored is written in the tag TAG. The command identification code CODE includes identification data IDP which identifies the contents of the draw command and other information required for the draw command. The polygon drawing data PD is constituted by the data on the coordinates of the vertices of the polygon. If the draw command IP is a command to draw a quadrangular polygon and the inside of the polygon is to be mapped in a single color, the identification data IDP indicates such and the data of the color to be mapped is specified as other necessary information.

Figure 6:
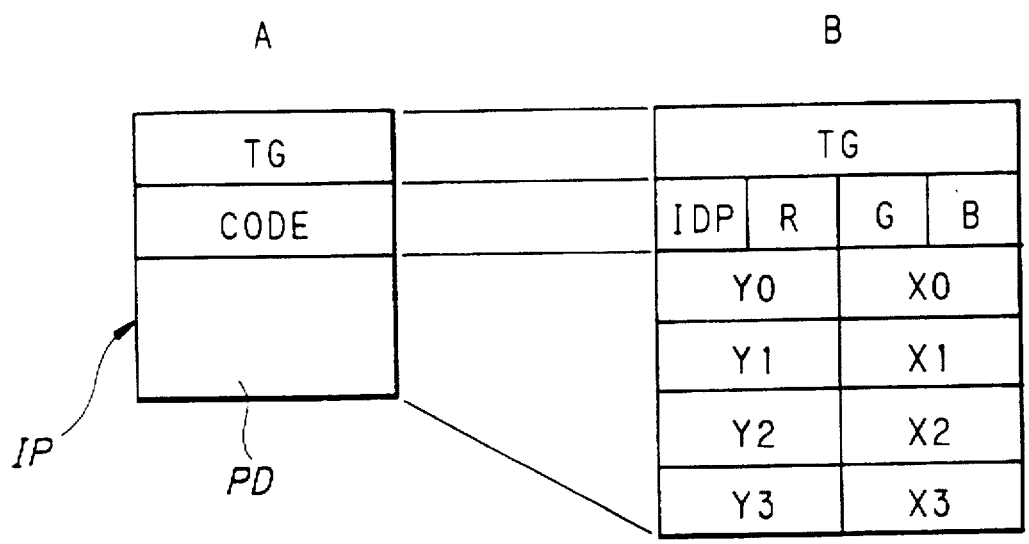
FIG. 6 shows an example of a polygon draw command in an embodiment of an image generation apparatus according to the present invention.

An example of a draw command for a quadrangular polygon is shown at B in FIG. 6. This draw command includes the coordinates of four points (X0, Y0), (X1, Y1), (X2, Y2) and (X3, Y3) and the color data of the three primary colors (R, G, B) for mapping the inside of the polygon in one color.

The CPU 42 calculates the movements of the object and the viewpoint and creates a string of polygon draw commands on the main memory 43 based on control input from the user via the control pad 71. Then, it rewrites the tags of the polygon draw commands in accordance with the displaying order using the Z data. At this time, the addresses of the draw commands on the main memory 43 is not changed, but only the tags are rewritten.

When this draw command string is completed, the sorting controller 45 transfers the draw commands one by one from the main memory 43 to the drawing device portion 61 in an order according to the tags TG of the draw commands. Therefore, the FIFO buffer 62 only needs to have a capacity to store one draw command.

Figure 7:
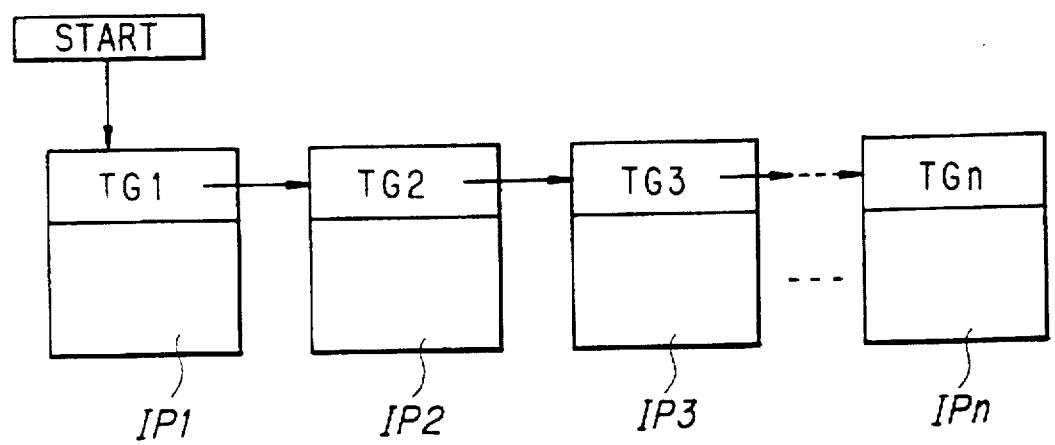
FIG. 7 illustrates the order in which polygons are draft and displayed in an embodiment of an image generation apparatus according to the present invention.

Since the data transferred to the drawing device portion 61 has already been sorted, as shown in FIG. 7, the drawing device portion 61 sequentially executes the polygon draw commands IP1, TP2, IP3, . . . , IPn in accordance with the respective tags TG1, TG2, TG3, . . . , TGn and stores the result in the drawing area AD of the frame memory 63.

When a polygon is drawn, data is sent to a gradient calculation unit of the drawing device portion 61 for a gradient calculation. A gradient calculation is a calculation to obtain the gradient of the plane of the mapping data for filling the inside of the polygon to be drawn. In the case of texturing, the polygon is filled with texture image data and, in the case of glow shading, the polygon is filled with brightness values.

Figure 8:
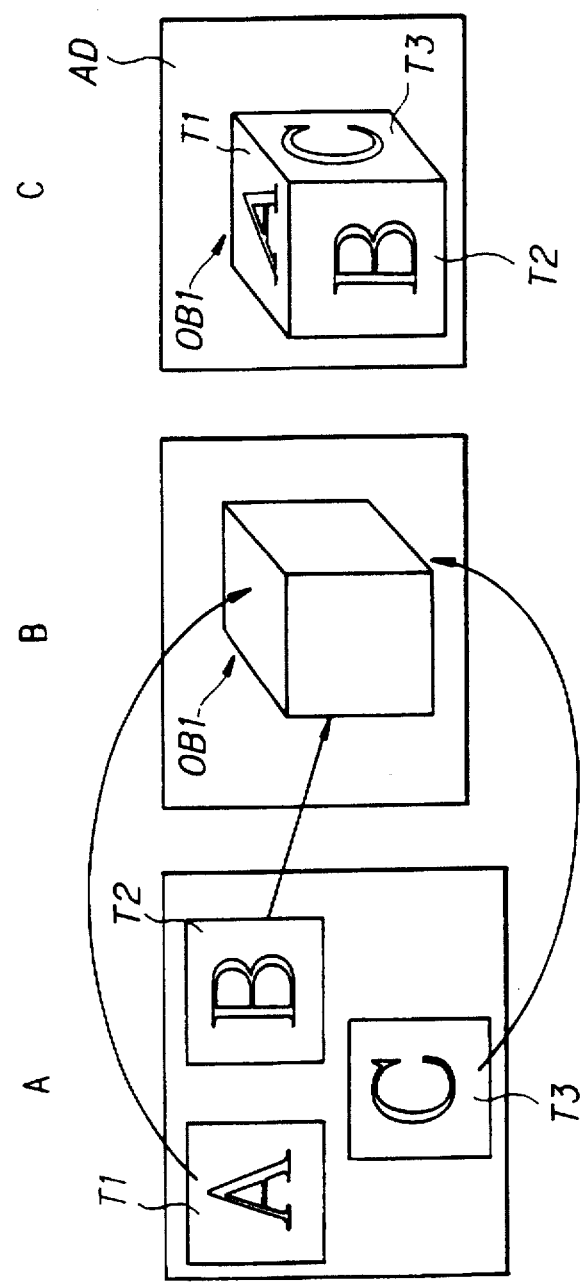
FIG. 8 illustrates texture mapping.

When a polygon that constitutes a face of an object is textured, the texture data in the texture area AT is subjected to two-dimensional mapping. For example, texture patterns T1, T2, and T3 as indicated at A in FIG. 8 are converted into coordinates on a two-dimensional screen so that they will fit the polygons that constitute respective faces of an object as shown at B in FIG. 8. As shown at C in FIG. 8, the texture patterns T1, T2, and T3 thus mapped are applied to the respective faces of the object OB1. The product is placed in the image memory area AD and displayed on the display screen of the image display monitor 65.

In the case of still image texturing, texture patterns in the main memory 43 are transferred to the texture area AT of the frame memory 63 through the drawing device portion 61. The drawing device portion 61 applies them to the polygon. This provides still image textures on the object. The data of such still image texture patterns can be recorded on the CD-ROM disc.

Further, it is possible to perform dynamic image texturing. In the case of dynamic image texturing, compressed dynamic image data from a CD-ROM disc is temporarily read into the main memory 43, as described above. Then, this compressed image data is sent to the image decompression device portion 51 which decompresses the image data. As described above, a part of this decompression process is carried out by the CPU 42.

The decompressed image data is sent to the texture area AT of the frame memory 63. Since the texture area AT is provided in the frame memory 63, the texture patterns themselves can be rewritten on a frame-by-frame basis. Thus, when dynamic images are sent to the texture area AT, the textures dynamically change as a result of the rewriting on a frame-by-frame basis. Texture mapping utilizing these dynamic images in the texture area will allow texturing with dynamic images.

As described above, by sending the image data decompressed by the image decompression device portion 51 to the image memory area AD of the frame memory 63, it is possible to display dynamic images as background images on the screen of the image monitor screen 65 and to fill the image memory area AD only with the images generated by the CPU 42 to draw an image on the screen of the image display monitor 65. It is also possible to draw an object utilizing the polygon drawing by the CPU 62 over a still image obtained by decompressing image data from a CD-ROM disc on the image memory area AD.

[Description of Texture Mapping Process]

Next, a description will be made with reference to FIGS. 1–3 on a texture mapping process performed by the frame memory 63 and the drawing device portion 61.

In this embodiment, as described above, texture images to be used for texture mapping are fetched from a CD-ROM disc and are subjected to decompress-decoding. Thereafter, they are written in the texture area AT of the frame memory 63. The images prepared as the texture images have a normal brightness and a normal appearance.

In this embodiment, the mapping the texture images in this texture area are texture-napped with the original brightness thereof to which a shading factor K=1 is assigned (the brightest part with respect to the virtual light source) is referred to as a normal mode, and the mapping of the texture images with a brightness higher than the original brightness is referred to as a special mode.

Figure 2:
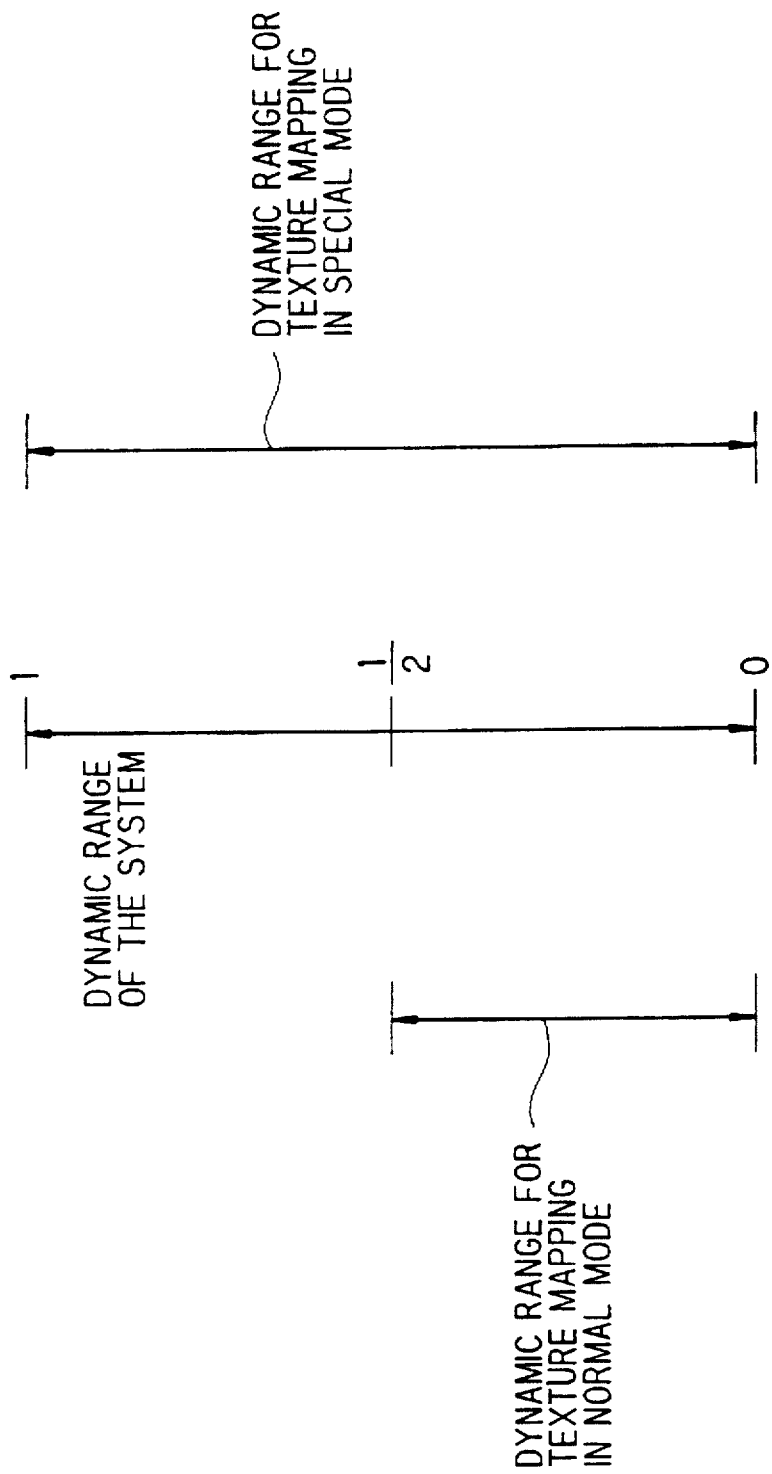
FIG. 2 illustrates an embodiment of a method of generating images according to the present invention.

As shown in FIG. 2, in this embodiment, the dynamic range for the normal mode is one half the dynamic range for brightness rendering of the system as a whole while the dynamic range for the special mode is the same as the dynamic range for brightness rendering of the system as a whole. In the special mode, therefore, image rendering can be performed with a brightness higher than that of the texture images prepared in the texture area AT.

Specifically, in the normal mode, the CPU 42 performs texture mapping in the one half on the darker side of the dynamic range for brightness rendering of the system as a whole with the shading factor K1 for this normal mode obtained for each polygon within the range expressed by $0 \leq K1 \leq 1$.

On the other hand, in the special mode, the shading factor K2 for mapping in this mode is set within the range expressed by $K2>1$ to obtain texture-mapped images brighter than the original texture images. For example, K2 is set equal to 2 for a pattern of explosion.

With such an arrangement, the texture images prepared in advance may be those having a normal brightness, as described above.

In this case, however, the maximum value of the brightness that can be rendered by the original texture images is lower than the maximum value of the brightness that can be rendered by the system, the former being one half the latter in this embodiment.

Figure 1:
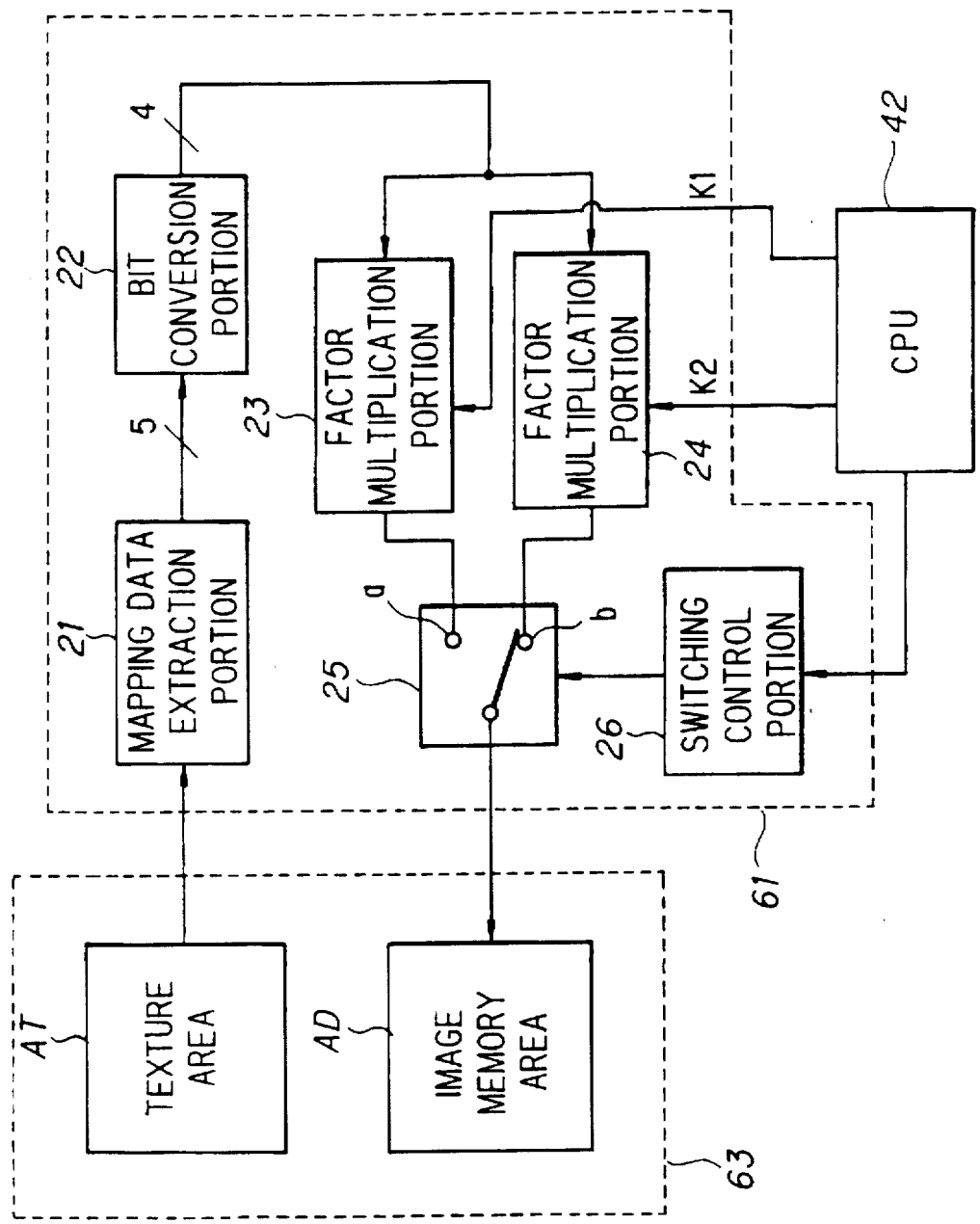
FIG. 1 is a block diagram of an embodiment of a major part of an image generation apparatus according to the present invention.

FIG. 1 is a block diagram of a part of the drawing device portion 61 which is for the texture mapping process.

In this embodiment, the data for each pixel in a texture image is constituted by information on the three primary colors (red (R), green (G), and blue (B)) each of which is represented by five bits.

In the drawing device portion 61 shown in FIG. 1, the part for the texture mapping process is constituted by a mapping data extraction portion 22, a bit conversion portion 22, factor multiplication portions 23 and 24, a switching circuit 25, and a switching control porion 26.

The mapping data extraction portion 21 extracts q texture image to be used for the mapping process from among the texture images stored in the texture area AT and supplies it to the bit conversion portion 22. As shown at A and B in FIG. 3, the bit conversion portion 22 deletes the least significant bit of each of the data for three primary colors R (red), G (green), and B (blue) represented by 5 bits of the texture image data extracted by the mapping data extraction portion 21, thereby converting them into data for three primary colors R1, G1, and B1 which are each represented by the four significant bits. The original color of the texture image is rendered within a range that is one half the dynamic range of brightness of the image generation apparatus using the data for three primary colors R1, G1, and B1 each represented by four bits.

The output of the bit conversion portion 22 is supplied to the factor multiplication portions 23 and 24. The factor multiplication portion 23 performs the multiplication of the shading factor K1 in the texture mapping in the normal mode. The factor multiplication portion 24 performs the multiplication of the shading factor K2 in the texture mapping in the special mode. As described above, the shading factor K1 satisfies $0 \leq K1 \leq 1$. The shading factor K2 satisfies $K2 > 1$ and is fixed to 2 in the case of a pattern of an explosion.

These factors K1 and K2 are calculated by the CPU 42 for each polygon with a virtual light source set. They are passed onto the drawing device portion 61 to be supplied to the respective factor multiplication portions 23 and 24.

Figure 3:
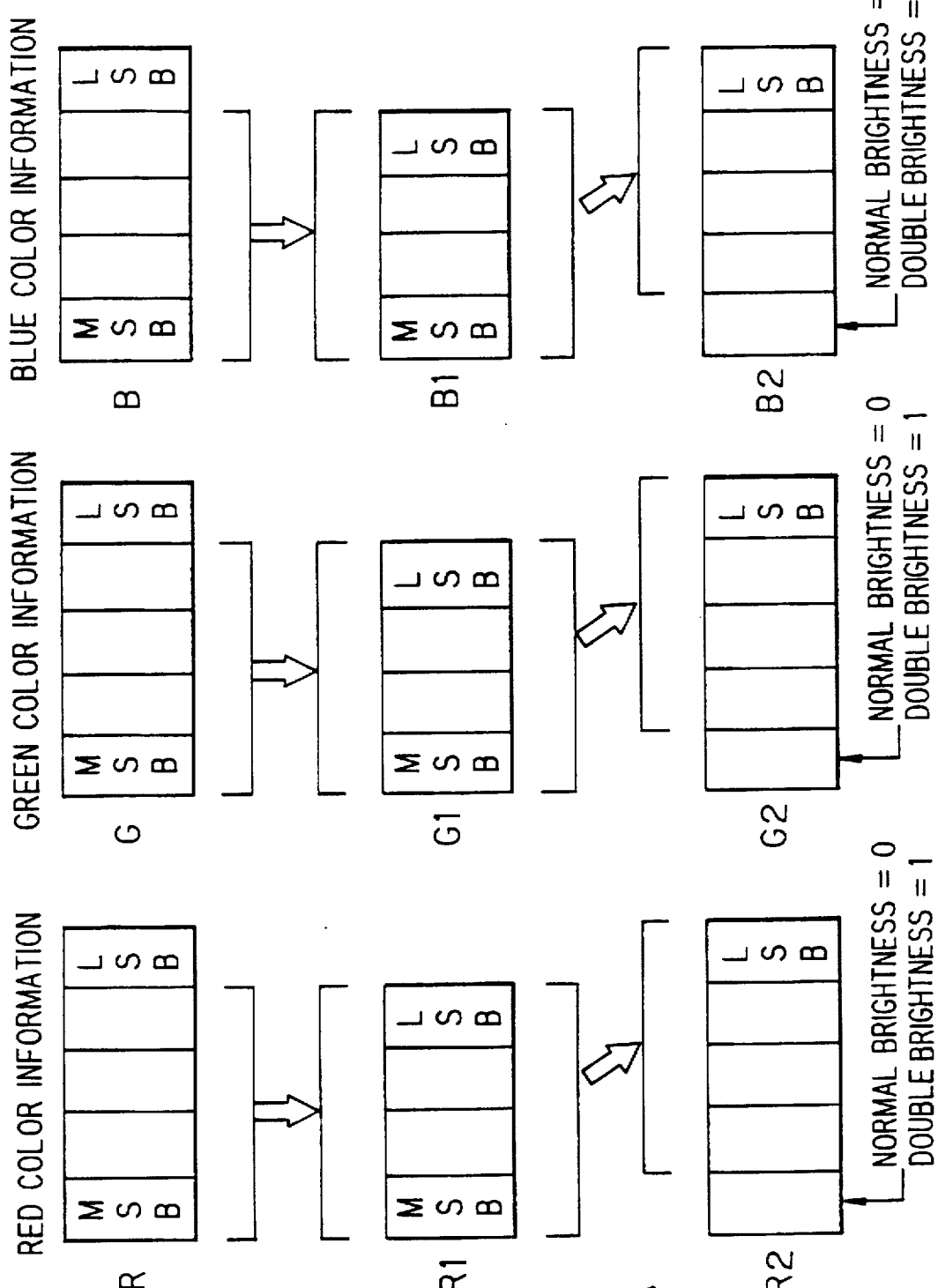
FIG. 3 including

As shown at C in FIG. 3, the data output by the factor multiplication portion 23 is added with one "0" bit on the side of the most significant bit of each of the data of three primary colors represented by four bits. Thus, each of the data of three primary colors is output as five bits. The data output by the factor multiplication portion 24 is multiplied by K2. Each of the data of three primary colors is output as five bits. Specifically, when carries are generated, one "1" bit as a carry is added to the side of most significant bit of each of the data of three primary colors represented by four bits and, when no carry is generated, one "0" bit is added to the side of most significant bit of each of the data. In the case of a pattern of an explosion, since K2=2, one "1" bit is added to the side of the most significant bit of each of the data of three primary colors represented by four bits. Thus, multiplication by a factor of 2 is performed.

The output of the factor multiplication portions 23 and 24 is supplied to the circuit 25 for switching between the normal and special modes. The switching circuit 25 is switched by a switching signal from the switching control portion 26. The switching control portion 26 forms a switching control signal of the switching circuit 25 based on a mode switching signal from the CPU 42.

In the case of the normal mode, the switching circuit 25 is switched to an input terminal a. This causes the image data from the factor multiplication portion 23 to be transferred to the image memory area AD of the frame memory 63, thereby causing texture mapping. Since the factor K1 by which the image data is multiplied at the factor multiplication portion 23 satisfies $0 \leq K1 \leq 1$, the mapping is performed with a brightness which is equal to or lower than the original brightness of the texture image. As a result, the texture mapping provides natural brightness and appearance.

In the case of the special mode, the switching circuit 25 is switched to an input terminal b. This causes the image data from the factor multiplication portion 24 to be transferred to the image memory area AD of the frame memory 63, thereby causing texture mapping. For example, if a pattern of an explosion is mapped, K2 is set equal to 2 to map the original texture image with a double brightness.

Thus, according the above-described embodiment, the dynamic range for brightness rendering during texture mapping in the normal mode is one half of the dynamic range for brightness rendering of the system, and this makes it possible to render a brightness up to twice the brightness of the original color of the prepared texture image using texture mapping.

Although the dynamic range for brightness rendering during texture mapping in the normal mode is one half of the dynamic range for brightness rendering of the system in the above-described embodiment, the level of the dynamic range for brightness rendering during texture mapping in the normal mode is not limited to that of the embodiment but it depends on the resolution in the direction of the brightness required for texture mapping in the normal mode (the gradation of the brightness) and the level of the brightness which must be obtained from the prepared texture image.

Various modifications to the present invention will become apparent to those skilled in the art from the foregoing description and accompanying drawings. Accordingly, the present invention is to be limited solely by the scope of the following claims.

What is claimed is:

1. Apparatus for mapping a texture image having a plurality of pixels onto a polygonal area having a dynamic brightness range greater than a dynamic brightness range of said texture image with respect to a virtual light source, wherein a plurality of polygonal areas are displayed on a two-dimensional display with a three-dimensional appearance, said apparatus comprising:

means for ascertaining a brightness level of each of said pixels of said texture image with respect to said virtual light source;

means for reducing the ascertained brightness level of each of said pixels to produce reduced brightness levels;

means for shading said polygonal area onto which said pixels of said texture image are mapped by multiplying the reduced brightness levels of said pixels by a shading factor, said shading factor being greater than 1 to produce a mapped texture image having a dynamic brightness range greater than the dynamic brightness range of said texture image; and coordinate converting means for converting coordinates of said plurality of polygonal areas such that said plurality of polygonal areas are displayed on said two-dimensional display with said three-dimensional appearance.

* * * * *